(12) United States Patent
Beckett

(10) Patent No.: US 6,364,293 B1
(45) Date of Patent: Apr. 2, 2002

(54) FENDERS

(75) Inventor: Robert Prentice Beckett, Bangor (GB)

(73) Assignee: Valpar Industrial Limited, Bangor (GB)

( * ) Notice: Subject to any disclaimer, the term of this patent is extended or adjusted under 35 U.S.C. 154(b) by 0 days.

(21) Appl. No.: 09/485,294

(22) PCT Filed: Aug. 6, 1998

(86) PCT No.: PCT/GB98/02381

§ 371 Date: Jun. 13, 2000

§ 102(e) Date: Jun. 13, 2000

(87) PCT Pub. No.: WO99/07946

PCT Pub. Date: Feb. 18, 1999

(30) Foreign Application Priority Data

Aug. 8, 1997 (GB) .............................................. 9716820
Apr. 9, 1998 (GB) .............................................. 9807666

(51) Int. Cl.[7] .......................... F16M 1/00; F16M 11/00; F16M 3/00; F16M 5/00; F16M 7/00
(52) U.S. Cl. ........................ 267/140; 267/153; 267/158
(58) Field of Search ................................. 267/139, 140, 267/145, 152, 153, 158

(56) References Cited

U.S. PATENT DOCUMENTS

| 3,359,030 | A | * | 12/1967 | Newman | ..................... 267/140 |
|---|---|---|---|---|---|
| 3,574,379 | A | * | 4/1971 | Jordan | ......................... 267/140 |
| 3,804,395 | A | * | 4/1974 | Muller | ........................ 267/140 |
| 3,863,909 | A | * | 2/1975 | Weber | ......................... 267/140 |
| 3,865,358 | A | * | 2/1975 | Butters | ........................ 267/140 |
| 3,937,170 | A | * | 2/1976 | Drewett | ....................... 267/140 |
| 3,938,840 | A | * | 2/1976 | Haase et al. | ................. 267/140 |
| 4,428,568 | A | * | 1/1984 | McNatt et al. | .............. 267/140 |
| 4,548,150 | A | * | 10/1985 | Drewett | ....................... 267/140 |
| 4,925,224 | A | * | 5/1990 | Smiszek | ...................... 267/140 |
| 5,031,947 | A | * | 7/1991 | Chen | ........................... 267/139 |
| 5,579,697 | A | * | 12/1996 | Burke | .......................... 267/140 |
| 5,639,072 | A | * | 6/1997 | McCall | ........................ 267/139 |

FOREIGN PATENT DOCUMENTS

WO    WO8600051    *  1/1986  ................. 267/140

* cited by examiner

Primary Examiner—Christopher P. Schwartz
Assistant Examiner—Devon Kramer
(74) Attorney, Agent, or Firm—Ronald E. Greigg

(57) ABSTRACT

An elongate or continuous fender having a surface mounting meeting portion and a conjoined fendering body. The meeting portion includes one or more elongate or continuous mounting pieces located alongside the fendering body to create upper and lower shoulders. The shoulders provide one part of a two part fastening with a surface mounting. The mounting piece can be an elongate strip. The fender and surface mounting together form a suitable impact-energy absorbing assembly. The form and shape of the fender provide a secure method of attaching such fenders to a supporting surface without affecting the fendering properties.

34 Claims, 2 Drawing Sheets

FENDERS

This invention relates to improvements to fenders, including a fender adapted to be attached to a supporting surface.

Fenders are designed to absorb the energy of a shock or impact. They are used in many varied locations, including marine environments, vehicles, fairs, hospitals, etc. One common fender is a solid strip of rubber. However, solid rubber is expensive.

Various fenders having a more open structure have been suggested, and one example is shown in our co-pending International Patent Application No. WO 97/44236A. However, there is still required a simple but secure method of attaching such fenders to a supporting surface without affecting the fendering properties.

Heretofore, U.S. Pat No. 4,910,280 discloses in one embodiment a fender bumper which can be used with others of its kind in a lengthwise arrangement along the outermost side wall of a dock. Each bumper has an outer skin and a foamed interior core and formed into a surface mounting meeting portion and a fendering body with a peripheral groove or channel separating the portion from the body. The dock connector of a selected length is mounted on the side wall of the dock to receive one or more bumpers therein either in a side-by-side relationship or in a laterally-spaced relationship as desired.

Ties or tags could be used to fix or fasten continuous fenders to a boat, pier, pontoon, vehicle, wall, etc. However, ties take time and effort to fasten. Ties are also unsightly, and can protrude making them prone to snagging. Direct attachment, e.g. using bolts, through the fender would diminish the protective property of the fender, and attachment means that pass around the fender would overlie the contact surface during any impact again diminishing the protective property.

It is an object of the present invention to provide a form of attachment for a fender which obviates or mitigates the above disadvantages.

According to one aspect of the present invention, there is provided an elongate or continuous fender having a surface mounting meeting portion which is flat or substantially so and a tubular fendering body conjoined together by a covering therearound, the meeting portion including one or more elongate or continuous mounting pieces of an elongate or continuous strip and being located alongside the fendering body to create upper and lower shoulders which shoulders extend outwardly from each other at the top and bottom of the meeting portion and provide one part of a two part fastening with a surface mounting.

The shoulders provide a means for the surface mounting to grip the fender without affecting or interfering with the adjacent fendering body and its ability to fend.

The surface mounting meeting portion is preferably located only on one side of the fendering body. Thus, the majority of the contact surface of the fender, generally the surface(s) of the fendering body facing outwardly from the conjoined supporting surface, remains free, and thus maintains its impaction and protection ability.

The mounting piece or mounting pieces may be of any suitable size, shape or profile.

The strip is preferably of substantially equal or greater width than the adjacent part of the fendering body. The width of the strip may also be wholly or substantially the same width as the surface mounting facing the meeting portion of the fender.

The strip may be formed by two or more conjoined or separate pieces which provide the same effect as a single strip once in place.

The covering may be made from any suitable material, e.g. a known wrapping or tape or sheath-like material. Preferably, the covering is a plastics material, and is vacuum-formed around the mounting piece(s) and fendering body. The covering is preferably of uniform thickness.

The fendering body may have any size, shape and profile. Common profiles are circular, semi-circular, or arcuate. The present invention is not restricted by the shape and profile of the fendering body.

One possible form of fendering body comprises a tubular casing surrounding a core of a plurality of tubes. The tubes could be divided into two more sets of tubes, each set being distinct or discrete. The sets of tubes could be arranged in a concentric or other geometric pattern. The tubes or each set of tubes are preferably conjoined and held together by a wrapping. The wrapping could be spirally wound around the tubes. Further illustration of a suitable fendering body is shown in our co-pending International Patent Application No. WO 97/44346A, which is incorporated herein by way of reference.

The fender may be formed in discrete lengths or units, and cut to size as and where necessary, generally on location. The fender may be flexible longitudinally so as to form arcuate shapes to fit curved edges. End caps could be added to any open ends of the fender to help prevent the ingress of any water thereinto. The outer surface of the fender is preferably impermeable to water.

One form of seemingly continuous fender of the present invention may be formed by the conjoining of two or more lengths of elongate fender by connecting pieces, e.g. sleeves adapted to fit over or around the adjacent or neighbouring ends of the fender lengths. The connecting pieces could be straight, angled or corner pieces, preferably adapted to provide a smooth outer surface along the fender. and to provide a continuous outer surface which is wholly or substantially impermeable to water in situ.

The surface mounting may be any form of fendering, mounting or securing means able to latch onto and around two or more shoulders and so form one part of a two part fastening means. Forms of surface mounting include brackets, clasps, moveable jaws, etc. The surface mounting may be formed by discrete possible elongate units, or be continuous alongside the fender. The surface mounting may comprise separate parts to hold each shoulder separately. Preferably, the surface mounting is a single entity, and is directly attachable to a surface, e.g. with screws or bolts, etc.

The surface mounting may be alternatively an elongate or continuous bracket with a surface mounting wall and two outstanding side walls adapted to receive the shoulders thereinbetween. The side walls may be shaped to form around the shoulders. The opening between the distal ends of the bracket is preferably restricted, possibly by the side walls converging, curving or folding inwardly towards each other. One or both side walls could also have inward facing edging or a flange at one or each distal end, and could also be flexible to assist location of the surface mounting meeting portion of the fender into and/or out of the bracket.

The bracket could also have any shape or profile, one general form being a "C" shape. One or more locking beads could also be used to increase the pressure between a side wall or the side walls and one or both shoulders. Where the fender includes an elongate or continuous strip, the strip may be of greater width than the opening between the side walls of the bracket such that the strip can secure the neighbouring part of the fender within the bracket.

The surface mounting can be made from any suitable material including rubber, plastic, and metal such as aluminium. The surface mounting could be made of elongate lengths, e.g. by extrusion, and cut as desired or necessary. Some longitudinal flexibility in the surface mounting may assist its mounting on curved surfaces, e.g. on boats.

According to a second aspect of the present invention, there is provided an impact-energy absorbing assembly comprising an elongate or continuous fender as defined above and one or more surface mountings for supporting the fender on a surface.

According to a third aspect of the present invention, there is provided a process for manufacturing an elongate or continuous linear fender comprising a fendering body and an elongate strip surrounded by an outer covering, the fendering body having a core of a plurality of tubes and a elongate plastic foam casing, comprising the steps of:

(a) drawing the tubes from their individual sources and aligning them collectively;
(b) longitudinally slitting the casing;
(c) feeding the aligned tubes into the casing through the slit to form the fendering body;
(d) aligning the strip alongside the casing; and
(e) enveloping the strip and casing with the outer covering.

The tubes may have a wrapping located around them prior to feeding into the casing. Once the tubes are within the casing, the slit may be glued to reform the casing. The outer sheath may be a covering such as tape wound around the strip and casing, or a plastics extrusion, e.g. from a hollow, circular die, possibly with cooling, smoothing and/or vacuum.

The fender may be partly, substantially or wholly phosphorescent or optically enhanced.

The term "phosphorescent" as used herein includes the terms luminescent and fluorescent. Preferably, the phosphorescence is photoluminescence, which provides a relatively long period of return light in response to activation. The term "optical enhanced" as used herein includes any form of activated optical enhancement or brightening in diminished light or darkness. Activation could be from daylight, UV-light, etc. The optical enhancement could be provided by one or more optical brighteners in the outer surface material.

A phosphorescent or optically enhanced fender will increase the visibility or the fender, especially in darkness. A substantial number of people do in fact fall off piers etc. during darkness. As marine fenders are usually located at the edges of boats, piers, pontoons etc., the phosphorescence can show the location of the fender and hence the edge of the pier, etc. This should reduce the risk of people accidentally falling into the adjacent water. This could also reduce the need for separate lighting.

The phosphorescent or optically enhanced fender may be discrete or continuous. The phosphorescence or optically enhancement can be applied by any means, e.g. use of a relevant paint or strip or cover, or printing a relevant compound onto the fender, or by integral forming with the fender (or at least its outer cover), possibly by co-extrusion.

The term "fender" as used herein includes any structure, unit, installation. etc. designed or adapted to guard or protect a body or surface from contact or impact with another body or surface. It includes protective rails and strips, as well as marine fenders and vehicle loading bay protectors.

BRIEF DESCRIPTION OF THE DRAWINGS

Embodiments of the present invention will now be described by way of example only and with reference to the accompanying drawings in which.

DETAILED DESCRIPTION OF THE PREFERRED EMBODIMENTS

Figure 1:
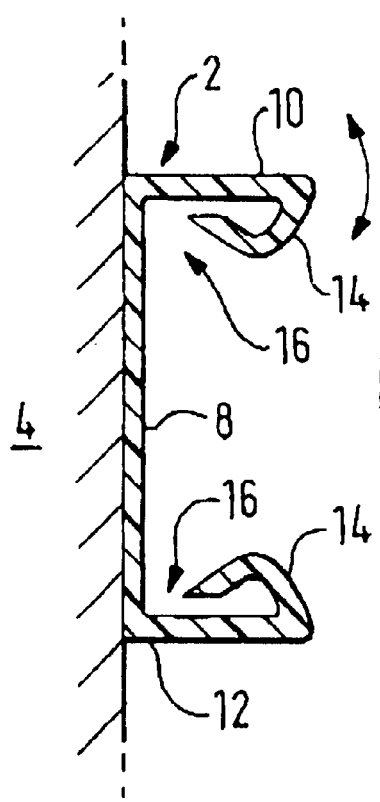
FIG. 1 is a cross-sectional side view of a surface mounting bracket for use with a fender of the present invention.

Referring to the drawings, FIG. 1 shows a bracket 2 as a surface mounting for attaching and supporting a continuous fender on a supporting surface 4, e.g. a pier, wall or vehicle. The bracket 2 has a surface mounting wall 8 and upper and lower outstanding side walls 10,12 respectively.

The side walls 10,12 are straight, and have inwardly facing ridges 14 at their distal ends to reduce the size of the bracket opening, and so create upper and lower pockets 16 within the bracket 2 for location of the shoulders of a fender.

Figure 2:
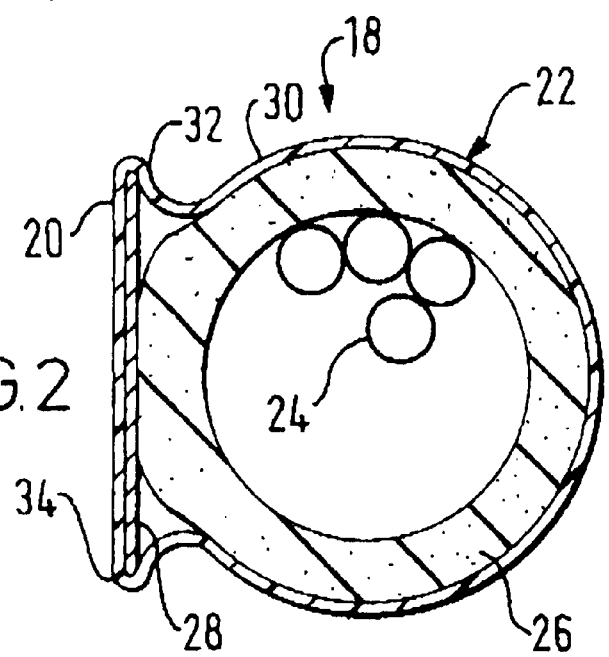
FIG. 2 is a cross-sectional side view of a fender according to a first embodiment of the present invention.

FIG. 2 shows a fender 18 having a surface mounting wall meeting portion 20 and a fendering body 22. The fendering body 22 has a core of a plurality of tubes 24 (partially shown) surrounded by a casing 26 of insulating foam. The fender 18 includes an elongate strip 28 as its mounting piece, and the strip 28 and fendering body 22 are conjoined by and enclosed within an outer covering or sheath 30. The location of the strip 28 against the side of the fendering body forms upper and lower shoulders 32,34 respectively on the meeting portion 20. The outer covering 30 should be a water-impermeable material.

Figure 3:
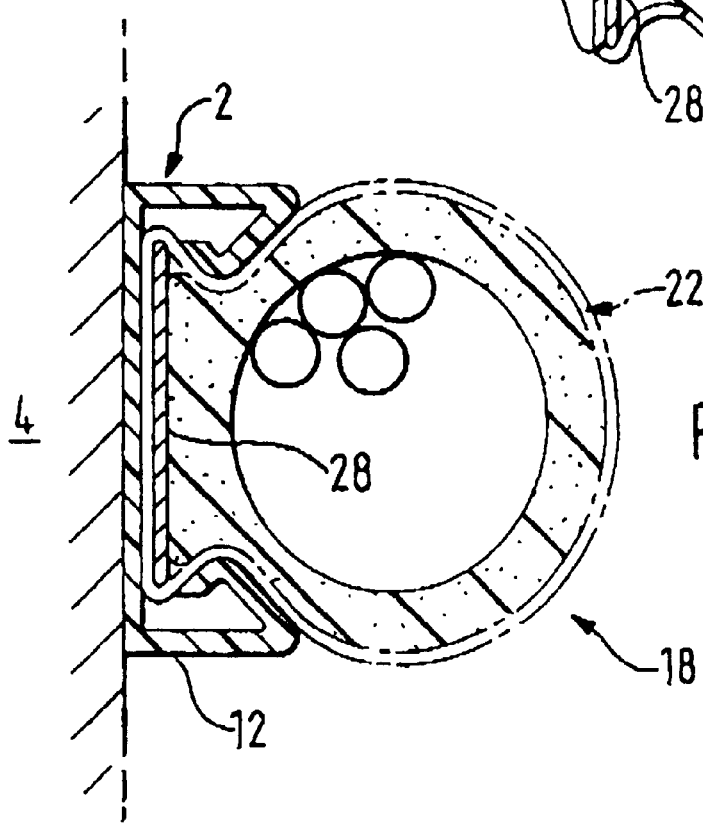
FIG. 3 is a cross-sectional side view of the combination of the bracket in FIG. 1 and the fender in FIG. 2 to form an impact-energy absorbing assembly according to a second embodiment of the present invention.

As shown in FIG. 3, the meeting portion 20 and shoulders 32,34 form one part of the fastening of the fender 18 to the supporting surface 4, the second part being the bracket 2. Together, they form an impact-energy absorbing assembly. The strip 28 is wider than the opening between the side walls 10,12 and is close to or substantially the same width as the inner surface of the surface mounting wall 8. The strip 28 could be made from a plastic or aluminium alloy and be a few millimetres thick.

The use of the strip 28 creates particular advantages for the present invention. Firstly, it creates one part of a simple means for fastening the fender 18 to a pier etc. which does not affect or interfere with the fendering body 22, either inherently or during fendering action. Secondly, the strip 28 and fendering body 22 are located within the outer covering 30, providing a sealed fender 18, which is therefore watertight and airtight and not liable to corrosion etc. The outer covering 30 may be formed from a polyethylene to create a covering 30 which does not (readily) mar or mark an impacting boat, etc. Polyethylene made also be given any colour, and is easily extrudable.

Thirdly, the use of the strip 28 simplifies manufacture of the fender 18. The formation of the fendering body 22 is similar to the known linear process for manufacturing beverage pythons, e.g. as shown in GB 2166833B. The strip 28 can easily be brought alongside the fendering body 22 during manufacture, and a thermoplastic outer covering 30 liquid-extruded around both parts followed by vacuum forming and cooling. The parts of the process could use the same extrusion machinery used in the manufacture of pythons, such that little new or adapted machinery is required.

In use, the surface mounting wall 8 of the bracket 2 is attached to the surface 4, e.g. with screws, bolts, etc. The bracket 2 may be made in extruded lengths which are cut to size on location. The fender 18 is then brought close to the bracket 2, and the meeting portion 20 is partly located within the bracket 2. For instance the lower shoulder 34 fits snugly in the lower pocket 16 of the bracket 2. The upper side wall 10 is then forced upwardly to create a sufficient gap to allow the upper shoulder 32 to reach the upper pocket 16.

The restricted distance between the ridges 14 of the side walls 10, 12 compared with the distance between the upper and lower shoulders 32,34 prevents removal of the meeting portion 20 from the bracket 2, and hence creates securement of the fender 18 with the bracket 2. To remove the fender 18 from the bracket 4, the reverse action is carried out.

The device of the present invention provides a simple way of securing an elongate or continuous fender to a surface, e.g. pier. The bracket can easily be cut to the desired length, and securing the fender to the bracket is a quick operation. The bracket can provide intermittent or more preferably continuous support for the fender along its length. The fender is also of simple manufacture, and preferably it can be coiled for ease of transportation and storage.

Figure 4:
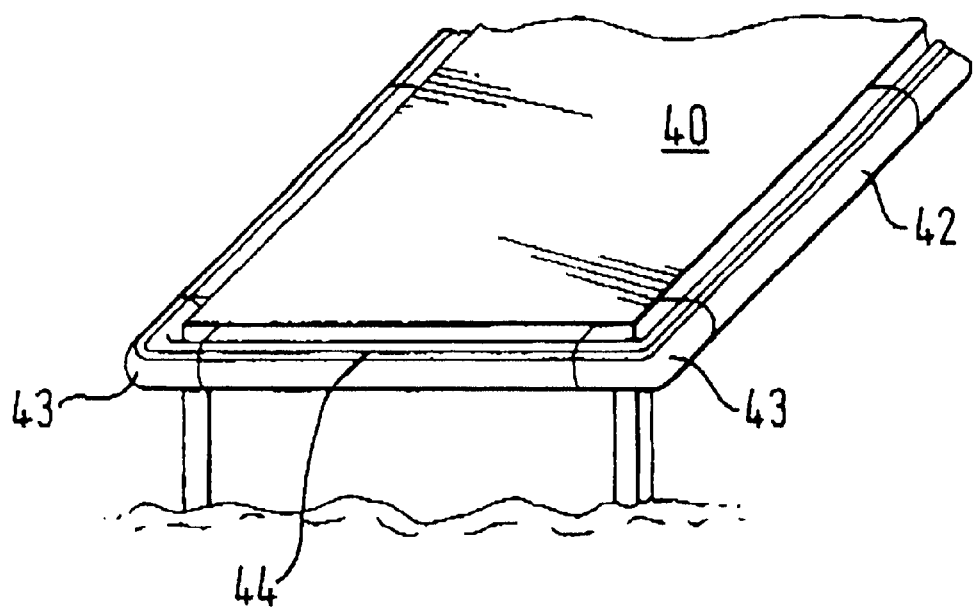
FIG. 4 is a perspective view of a phosphorescent fender according to a third embodiment of the present invention and a pier.

FIG. 4 shows the end of a pier 40 having a continuous fender 42 therearound. The fender 42 is formed from a number of straight lengths of elongate fender 18 as described above, conjoined where they met at the corners by corner sleeves 43. The sleeves 43 fit snugly over the ends of the fender lengths 18.

Along the top of the fender 42, a photoluminescent strip 44 has been printed. The photoluminescence of the strip 44, which will be energised by daylight, will increase the visibility of the fender 42 substantially, and during darkness provide a relatively long lasting visible warning to users of the pier 40, and possibly people approaching the fender 42 from the water, of location of the pier edges. Two or more strips could be added. The strips could be discrete or continuous, and/or straight or patterned.

Figure 5:
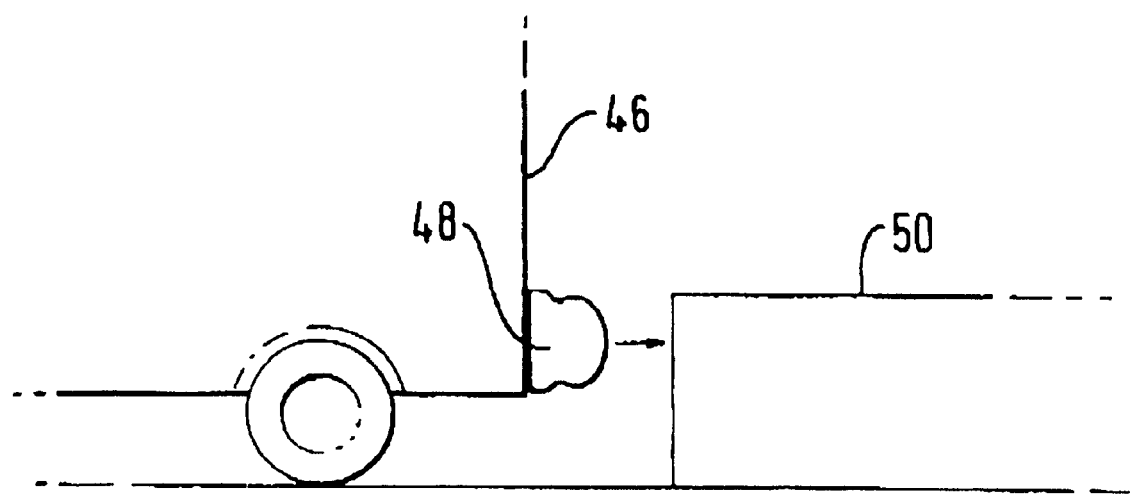
FIG. 5 is a side view of a vehicle with the impact-energy absorbing assembly of FIG. 3, and a loading bay platform.

FIG. 5 shows the rear end of a vehicle 46 such as a lorry having an impact-energy absorbing assembly 48 as shown in FIG. 3 along its rear side. The assembly 48 provides protection as the vehicle 46 reverses up to a loading bay platform 50.

The foregoing relates to preferred exemplary embodiments of the invention, it being understood that other variants and embodiments thereof are possible within the spirit and scope of the invention, the latter being defined by the appended claims.

What is claimed is:

1. An elongate or continuous fender having a flat or substantially flat surface mounting element (28) and a tubular fendering body (26) conjoined together by a covering (30) which surrounds said surface mounting element and said tubular fendering body, the surface mounting element (28) including one or more elongate or continuous mounting pieces formed of an elongate or continuous strip and being located alongside and contacting the fendering body to create upper and lower oppositely extending shoulders, said shoulders extending outwardly from each other at a top and a bottom of the meeting portion and providing one part of a two part fastening with a surface mounting.

2. A fender as claimed in claim 1, wherein the strip extends outwardly from the adjacent part of the fendering body.

3. A fender as claimed in claim 1, wherein a width of the strip is wholly or substantially the same width as the surface mounting element facing a meeting portion of the fender.

4. A fender as claimed in claim 1, wherein the covering (30) has a uniform thickness.

5. A fender as claimed in claim 1, wherein the covering of the fender is impermeable to water.

6. A fender as claimed in claim 1, wherein the surface mounting meeting portion is adapted to be fastened to a surface mounting which includes one or more surface mounting walls and one or more outstanding side walls.

7. A fender as claimed in claim 1, wherein the tubular fendering body comprises a casing surrounding a core formed by a plurality of elongated tubes (24).

8. A fender as claimed in claim 7, wherein the core comprises two or more sets of elongated tubes (24).

9. A fender as claimed in claim 7, wherein the plurality of tubes are conjoined by a wrapping.

10. A fender as claimed in claim 1, wherein the fender body is wholly or substantially circular in cross-section.

11. A fender as claimed in claim 1, wherein the fender is formed in lengths, and cut where necessary to a particular desired length.

12. A fender as claimed in claim 1, which comprises two or more lengths of elongate fender conjoined by one or more straight, angled or corner connecting pieces.

13. A fender as claimed in claim 1, wherein one or more ends of the fender are covered by an end cap.

14. A fender as claimed in claim 1, wherein the fender is flexible longitudinally.

15. A fender as claimed in claim 1, in which said fender is an impact-energy absorbing assembly comprising an elongate or continuous fender and one or more surface mountings for supporting the fender on a surface.

16. An assembly as claimed in claim 15, wherein the surface mounting is a bracket comprising a surface mounting wall and two outstanding side walls one of which engages each of said shoulders of said fender.

17. An assembly as claimed in claim 16, wherein the bracket has a restricted opening between the distal ends of the side walls.

18. An assembly as claimed in claim 16, wherein either one or both side walls converge towards the other side wall or together respectively.

19. An assembly as claimed in claim 16, wherein one or both side walls partly or wholly curve or fold inwardly towards each other.

20. An assembly as claimed in claim 16, wherein one or both side walls have inward facing edging or a flange at each distal end.

21. An assembly as claimed in claim 16, wherein one or both side walls are flexible to assist location of the surface mounting meeting portion of the fender into and/or out of the bracket.

22. An assembly as claimed in 16, wherein the surface mounting element comprises an elongate or continuous strip of greater width than the opening between the side walls of the bracket such that the strip can be secured in the neighboring part of the fender within the bracket.

23. An assembly as claimed in claim 16, wherein the bracket has a general "C" shape.

24. An assembly as claimed in claim 15, wherein the surface mounting is elongate or continuous.

25. An assembly as claimed in claim 15, wherein the surface mounting is formed in lengths, and cut where necessary to a desired length.

26. An assembly as claimed in claim 15, wherein the surface mounting is flexible longitudinally.

27. A fender as claimed in claim 1, wherein the fender is partly, substantially or wholly phosphorescent or optically enhanced.

28. A fender as claimed in claim 27, wherein the phosphorescence is photoluminescence.

29. A fender as claimed in claim 27, wherein the optical enhancement is provided by one or more optical brighteners in the outer surface material.

30. An assembly as claimed in claim 1, wherein the fender is partly, substantially or wholly phosphorescent or optically enhanced.

31. An elongate or continuous impact energy absorbing fender assembly comprising a fender having a flat or substantially flat surface mounting element (28) and a tubular fendering body (26) conjoined together by a covering (30) which surrounds said surface mounting element and said tubular fendering body, the surface mounting element (28) including one or more elongate or continuous mounting pieces formed of an elongate or continuous strip and being located alongside and contacting the fendering body to create upper and lower oppositely extending shoulders, said shoulders extending outwardly from each other at a top and a bottom of the meeting portion and providing one part of a two part fastening with a surface mounting, one or more surface mountings for supporting said fender on a surface, said one or more surface mounting including an elongate or continuous locking bead, the bead being locatable between one side wall and one of the shoulders of the surface mounting meeting portion of the fender when within the surface mounting.

32. A process for manufacturing an elongate or continuous linear fender, comprising the steps of:

forming a flat or substantially flat surface mounting strip (28) of a desired length, forming a tubular casing (26) of a same length as the surface mounting piece, drawing small linear tubes (24) from their individual sources and aligning the tubes collectively;

longitudinally slitting the casing;

feeding the aligned tubes into the casing through the slit to form the fendering body;

aligning the strip alongside the casing; and enveloping the strip and casing with a covering (30) to cover and secure the strip and casing together to form a fendering body (18).

33. A process as claimed in claim 32, wherein the tubes have a wrapping located around them prior to feeding into the casing.

34. A process as claimed in claim 33, wherein once the tubes are within the casing, the slit is glued to reform the casing.

\* \* \* \* \*